(12) United States Patent
Wang et al.

(10) Patent No.: US 12,673,574 B2
(45) Date of Patent: Jul. 7, 2026

(54) PARTIALLY MAGNETIZED PAVEMENT FOR WIRELESS POWER TRANSFER TO ELECTRIC VEHICLES

(71) Applicant: RUTGERS, THE STATE UNIVERSITY OF NEW JERSEY, New Brunswick, NJ (US)

(72) Inventors: Hao Wang, Piscataway, NJ (US); Lukai Guo, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 500 days.

(21) Appl. No.: 18/239,429

(22) Filed: Aug. 29, 2023

(65) Prior Publication Data

US 2024/0067019 A1 Feb. 29, 2024

Related U.S. Application Data

(60) Provisional application No. 63/401,783, filed on Aug. 29, 2022.

(51) Int. Cl.
*B60L 53/38* (2019.01)
*B60L 53/122* (2019.01)
*H02J 50/10* (2016.01)

(52) U.S. Cl.
CPC ............. *B60L 53/38* (2019.02); *B60L 53/122* (2019.02); *H02J 50/10* (2016.02)

(58) Field of Classification Search
CPC .......... B60L 53/38; B60L 53/122; H02J 50/10
(Continued)

(56) References Cited

U.S. PATENT DOCUMENTS

| | | | | |
|---|---|---|---|---|
| 2016/0318413 A1* | 11/2016 | Roehrl | .................... | H02J 50/12 |
| 2017/0136897 A1* | 5/2017 | Ricci | ...................... | B60L 5/005 |
| 2022/0181919 A1* | 6/2022 | Chou | ................... | H02J 50/402 |

FOREIGN PATENT DOCUMENTS

| | | | | | |
|---|---|---|---|---|---|
| DE | 202013100530 U1 * | 5/2014 | ............. | H02J 50/10 |
| EP | 3566896 A1 * | 11/2019 | ............. | B60L 53/34 |

(Continued)

OTHER PUBLICATIONS

Chang, Kevin, et al., "Effects of Longitudinal Pavement Edgeline Condition on Driver Lane Deviation," Accident Analysis and Prevention, Jul. 2019 (accessible Apr. 13, 2019), pp. 87-93, vol. 128.

(Continued)

*Primary Examiner* — Raymond W Addie
(74) *Attorney, Agent, or Firm* — Talem IP Law, LLP

(57) ABSTRACT

A partially magnetized pavement is placed above a transmitter coil for improved efficiency of electric vehicles charging through wireless power transfer. The partially magnetized pavement includes a non-magnetized pavement portion positioned vertically above the transmitter coil and a magnetized pavement portion positioned vertically above a first area surrounded by the inner dimension of the transmitter coil and a second area outside the outer dimension of the transmitter coil. In some cases, the partially magnetized pavement further includes a transmitter coil having the inner dimension and the outer dimension and a capacitor electrically coupled to the transmitter coil to form a resistor-inductor-capacitor circuit at a system level. In some cases, a plurality of electric vehicle charging units are positioned in a center of a lane in a roadway and separated from one another by a predetermined distance along a direction of the lane in the roadway.

20 Claims, 8 Drawing Sheets

(58) Field of Classification Search
 USPC .................................................. 404/1, 17, 21
 See application file for complete search history.

(56) References Cited

FOREIGN PATENT DOCUMENTS

WO     WO-2009118914 A1 *  10/2009   ................ H02J 7/60
WO     WO-2017060387 A1 *   4/2017   ............... H01F 3/08

OTHER PUBLICATIONS

Chen, Feng, et al., "Dynamic Application of the Inductive Power Transfer (IPT) Systems in an Electrified Road: Dielectric Power Loss Due to Pavement Materials," Construction and Building Materials, Aug. 2017 (accessible Apr. 25, 2017), pp. 9-16, vol. 147.

Cirimele, Vincenzo, et al., "Challenges in the Electromagnetic Modeling of Road Embedded Wireless Power Transfer," Energies, Jul. 12, 2019, pp. 1-22, vol. 12, issue 14, article 2677.

Dong, Yifan, et al., "Optimal Study of Resonant Wireless Charging Coils for Electric Vehicles," 2018 21st International Conference on Electrical Machines and Systems (ICEMS), Oct. 2018, pp. 871-875, IEEE.

Edwards, Kyle A. T., et al., "Properties of a Magnetic Concrete Core Transformer for Application in Wireless Power Transfer Systems," Construction and Building Materials, Dec. 2019 (accessible Sep. 30, 2019), 14 pages, vol. 227, article 117041.

Li, Feng et al., "Magnetization Properties of Pavement Materials and Energy Loss Impact on Wireless Power Transfer," (English Abstract), China Journal of Highway and Transport, Mar. 2021, pp. 71-79, vol. 34, issue 3.

Gardner, Trevor, "Wireless Power Transfer Roadway Integration," Dec. 2017, 102 pages, Utah State University.

Hsu, J. U. W., et al., "A Wireless Power Pickup Based on Directional Tuning Control of Magnetic Amplifier," IEEE Transactions on Industrial Electronics, Jul. 2009 (accessible Apr. 17, 2009), pp. 2771-2781, vol. 56, issue 7.

Huang, Junbing, et al., "Energy-Saving R & D and Carbon Intensity in China," Energy Economics, Jun. 2021 (accessible Mar. 18, 2021), 13 pages, vol. 98 article 105240.

Jasim, Abbas F., et al., "Performance Analysis of Piezoelectric Energy Harvesting in Pavement: Laboratory Testing and Field Simulation," Transportation Research Record: Journal of the Transportation Research Board, Mar. 2019, pp. 115-124, vol. 2673, issue 3.

Jonah, Olutola, et al., "Wireless Power Transfer in Concrete via Strongly Coupled Magnetic Resonance," IEEE Transactions on Antennas and Propagation, Mar. 2013 (accessible Nov. 16, 2012), pp. 1378-1384, vol. 61, issue 3.

Kalwar, Kafeel Ahmed, et al., "Inductively Coupled Power Transfer (ICPT) for Electric Vehicle Charging—A Review," Renewable and Sustainable Energy Reviews, Jul. 2015 (accessible Mar. 30, 2015), pp. 462-475, vol. 47.

Lazzeroni, Paolo, et al., "Economic and Environmental Sustainability of Dynamic Wireless Power Transfer for Electric Vehicles Supporting Reduction of Local Air Pollutant Emissions," Renewable and Sustainable Energy Reviews, Mar. 2021 (accessible Nov. 9, 2020), 15 pages, vol. 138, article 110537.

Li, Haoran, et al., "Multiphysics Structured Eddy Current and Thermography Defects Diagnostics System in Moving Mode," IEEE Transactions on Industrial Informatics, Apr. 2021 (accessible May 26, 2020), 11 pages, vol. 17, issue 4.

Liu, Kai, et al., "Exploring the Energy-Saving Potential of Electromagnetic Induction Pavement via Magnetic Concentrating Technique," Energy, Nov. 2020 (accessible Aug. 25, 2020), 12 pages, vol. 211, article 118650.

Lu, M., et al., "Analysis of Resonant Coupling Coil Configurations of EV Wireless Charging System: A Simulation Study," Frontiers in Energy, Mar. 2020 (accessible Mar. 15, 2019), 14 pages, vol. 14, issue 1.

Mahmud, Mohammad Hazzaz, et al., "Efficient Wireless Power Charging of Electric Vehicle by Modifying the Magnetic Characteristics of the Transmitting Medium," IEEE Transactions on Magnetics, Jun. 2017 (accessible Jan. 17, 2017), 5 pages, vol. 53, issue 6.

Miller, John M., et al., "Elements of Wireless Power Transfer Essential to High Power Charging of Heavy Duty Vehicles," IEEE Transactions on Transportation Electrification, Jun. 2015 (accessible May 7, 2015), 31 pages, vol. 1, issue 1.

Moon, Sangcheol, et al., "Analysis and Design of a Wireless Power Transfer System With an Intermediate Coil for High Efficiency," IEEE Transactions on Industrial Electronics, Nov. 2014 (accessible Jan. 21, 2014), pp. 5861-5870, vol. 61, issue 11.

Onar, Omer C., et al., "Modeling, Simulation, and Experimental Verification of a 20-kW Series-Series Wireless Power Transfer System for a Toyota RAV4 Electric Vehicle," 2018 IEEE Transportation Electrification Conference and Expo (ITEC), Jun. 2018, 7 pages, IEEE.

Shang, Jincheng, et al., "The Transformer Equipment Selection's Update Decision Technical and Economic Analysis Model," Energy and Power Engineering, Jul. 2013, pp. 143-147, vol. 05, issue 04.

Shin, Jaegue, et al., "Design and Implementation of Shaped Magnetic Resonance Based Wireless Power Transfer System for Roadway-Powered Moving Electric Vehicles," IEEE Transactions on Industrial Electronics, Mar. 2014 (accessible Apr. 16, 2013), 14 pages vol. 61, issue 3.

Tavakoli, Reza, et al., "Analysis, Design, and Demonstration of a 25-KW Dynamic Wireless Charging System for Roadway Electric Vehicles," IEEE Journal of Emerging and Selected Topics in Power Electronics, Sep. 2018 (accessible Oct. 10, 2017), 16 pages, vol. 6, issue 3.

Venugopal, Prasanth, et al., "Roadway to Self-Healing Highways with Integrated Wireless Electric Vehicle Charging and Sustainable Energy Harvesting Technologies," Applied Energy, Feb. 2018 (accessible Jan. 8, 2018), pp. 1226-1239, vol. 212.

Wang, Haopeng, et al., "Laboratory and Numerical Investigation of Microwave Heating Properties of Asphalt Mixture," Materials, Jan. 4, 2019, 13 pages, vol. 12, issue 1.

* cited by examiner

Magnetic Field Lines 416

Coil 418

400

Pathway    412    Pathway

Partially Magnetized Pavement Surface Layer 406    404   406    404    406

414                 414

410

408         Coil 402

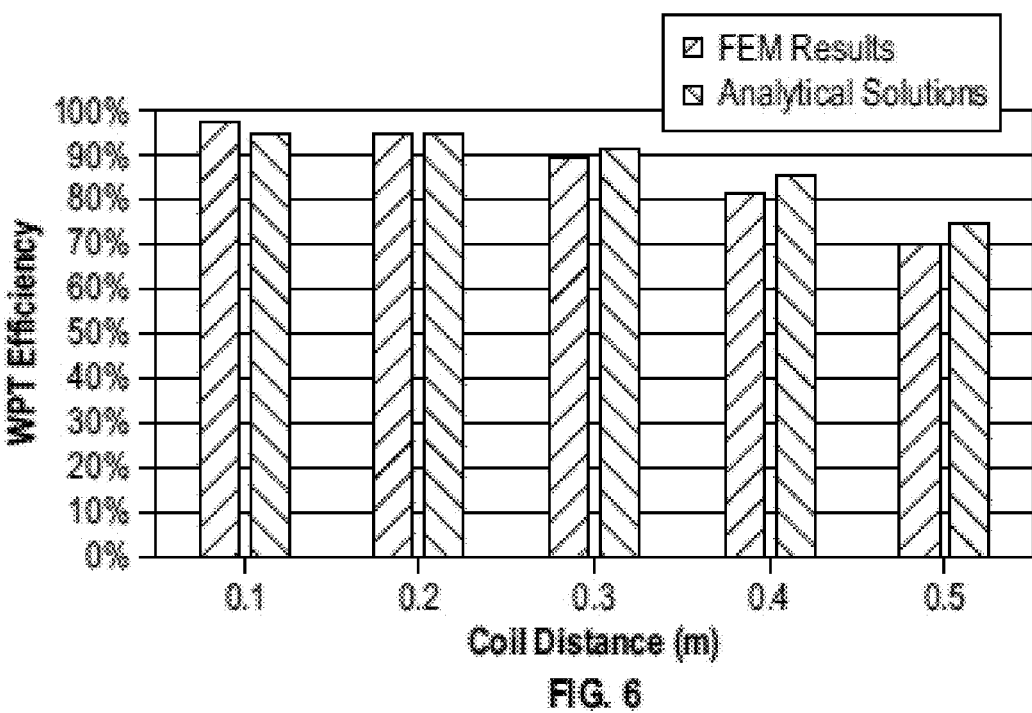
FIG. 6
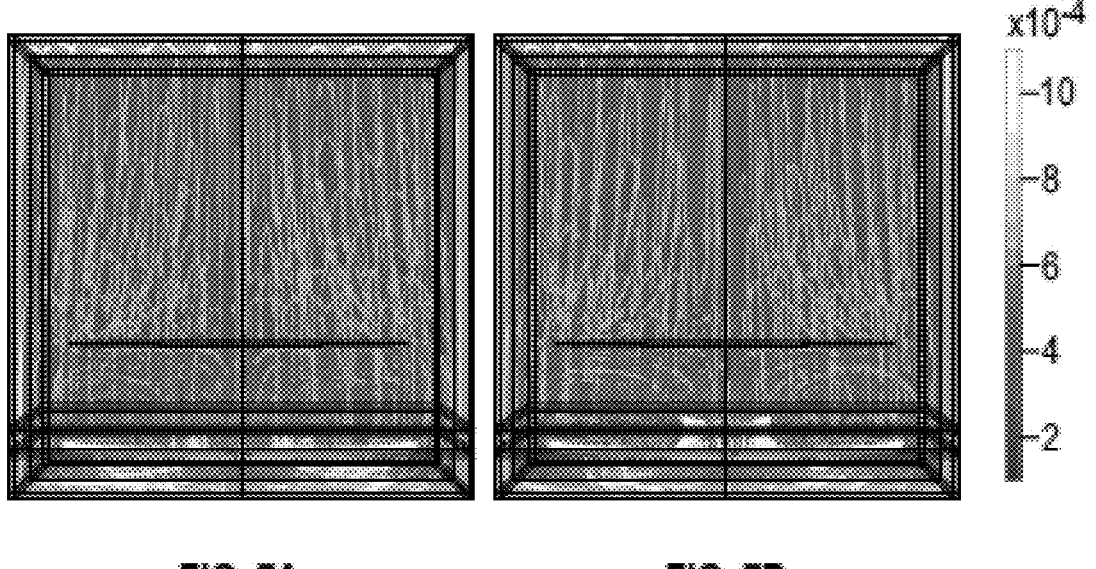
FIG. 7A                    FIG. 7B

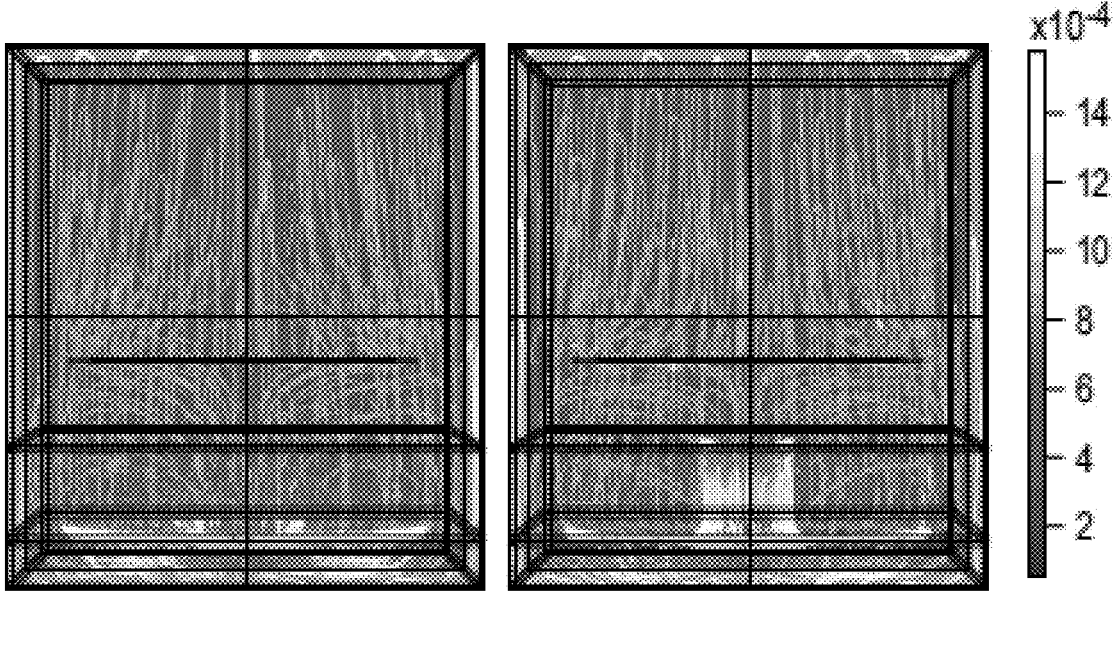
FIG. 8A                    FIG. 8B
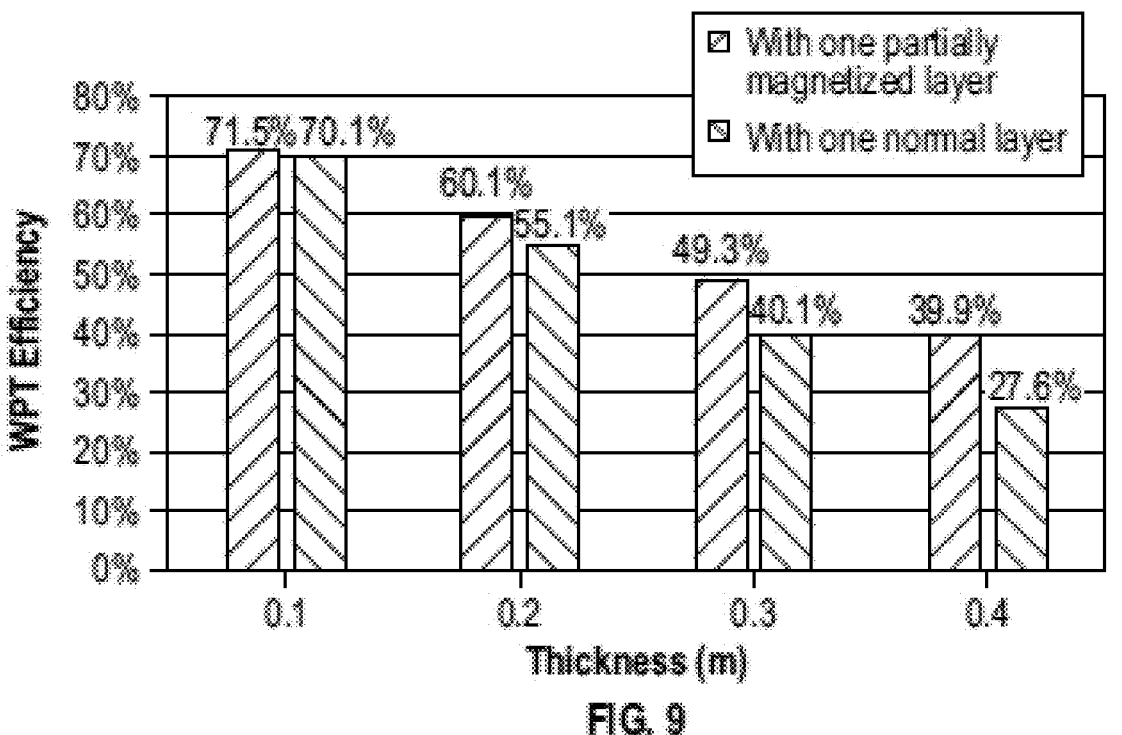
FIG. 9

PARTIALLY MAGNETIZED PAVEMENT FOR WIRELESS POWER TRANSFER TO ELECTRIC VEHICLES

BACKGROUND

Replacement of gasoline-powered vehicles with electric vehicles (EVs) leads to a reduction of greenhouse gas emissions. However, in addition to the cost of EVs, accessibility to charging stations and the amount of time required to charge EVs impose barriers for consumer acceptance of EVs. These barriers are exacerbated for electric trucks that are used for hauling goods, which are much heavier and need a longer driving range than personal EVs used for transportation of people.

Some solutions have been created to alleviate these barriers by developing electrified road systems in which batteries for the EVs can be recharged while driving. While promising, these solutions have had issues with creating a design that efficiently charges EVs while simultaneously protecting the electrified portions of these road systems (e.g., with a pavement/concrete layer over the electrified systems to protect them from damage due to being run over). Therefore, an electrified road system that efficiently charges EVs while simultaneously protecting the electrified portions of the road system is needed.

BRIEF SUMMARY

Partially magnetized pavements and methods for wireless power transfer to electric vehicles are described herein. Advantageously, the partially magnetized pavements and methods for wireless power transfer to EVs efficiently charge EVs by creating a magnetic field that is ideal for wireless charging of EVs while simultaneously protecting the electrified portions of the road system (e.g., transmitter coil(s)) by providing a solid pavement layer between the EVs and the electrified portions of the road system.

A partially magnetized pavement for improved efficiency of electric vehicles charging through wireless power transfer includes a non-magnetized pavement portion positioned vertically above a transmitter coil and a magnetized pavement portion positioned vertically above a first area surrounded by the inner dimension of the transmitter coil and a second area outside the outer dimension of the transmitter coil.

In some cases, the magnetized pavement portion includes ferromagnetic material. In some cases, the ferromagnetic material is ferrite powder. In some cases, the magnetized pavement portion comprises ferromagnetic material and conventional pavement construction materials. In some cases, the non-magnetized pavement portion is made from conventional pavement construction materials. In some cases, the first area of the magnetized pavement portion is less than or equal to an area within the inner dimension of the transmitter coil.

An electric vehicle pavement charging system includes a transmitter coil having an outer dimension and an inner dimension, a pavement layer including a non-magnetized pavement portion positioned vertically above the transmitter coil and a magnetized pavement portion position vertically above a first area surrounded by the inner dimension of the transmitter coil and a second area outside the outer dimension of the transmitter coil, and a capacitor electrically coupled to the transmitter coil to form a resistor-inductor-capacitor at a system level.

In some cases, the resistor-inductor-capacitor circuit produces electrical resonance at a system level. In some cases, the electrical vehicle pavement charging system further includes a resistor electrically coupled to the transmitter coil to further form the resistor-inductor-capacitor circuit. In some cases, the electric vehicle pavement charging system is positioned in a center of a parking space. In some cases, the electric vehicle pavement charging system is marked for an electric vehicle or an operator of the electric vehicle to position a receiver coil of the electric vehicle over the transmitter coil of the vehicle pavement charging system. In some cases, the electrical vehicle pavement charging system further includes an inverter electrically coupled to the transmitter coil. In some cases, the electrical vehicle pavement charging system further includes a power source electrically coupled to the inverter.

An electric vehicle roadway charging system includes a plurality of electric vehicle charging units positioned in a center of a lane in a roadway and along a direction of the lane in the roadway. Each electric vehicle charging unit of the plurality of electric vehicle charging units is separated from a next electric vehicle charging unit of the plurality of electric vehicle charging units along the direction of the lane in the roadway by a predetermined distance. Each electric vehicle charging unit of the plurality of electric vehicle charging units includes a transmitter coil having an outer dimension and an inner dimension, a pavement layer, and a capacitor electrically coupled to the transmitter coil to form a resistor-inductor-capacitor circuit at a system level. The pavement layer includes a non-magnetized pavement portion positioned vertically above the transmitter coil and a magnetized pavement portion positioned vertically above a first area surrounded by the inner dimension of the transmitter coil and a second area outside the outer dimension of the transmitter coil.

In some cases, the electric vehicle roadway charging system further includes one or more inverters, each of the one or more inverters electrically coupled to the transmitter coil of at least two electric vehicle charging units of the plurality of electric vehicle charging units. In some cases, the electric vehicle roadway charging system further includes a power source electrically coupled to the one or more inverters. In some cases, each electric vehicle charging unit of the plurality of electric vehicle charging units further includes an inverter electrically coupled to the transmitter coil. In some cases, the electric vehicle roadway charging system further includes a power source electrically coupled to the inverter of each electric vehicle charging unit of the plurality of electric vehicle charging units. In some cases, the resistor-inductor-capacitor circuit produces electrical resonance at the system level. In some cases, each electric vehicle charging unit of the plurality of electric vehicle charging units further includes a resistor electrically coupled to the transmitter coil to further form the resistor-inductor-capacitor circuit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 illustrates wireless power transfer efficiencies of the wireless power transfer system calculated from finite element model and analytical solutions in various coil distances.

FIGS. 7A and 7B illustrate magnetic flux distributions within wireless power transfer systems having a pavement layer of 0.1 meters, respectively, for a conventional and a magnetized pavement layer.

FIGS. 8A and 8B illustrate magnetic flux distributions within wireless power transfer systems having a pavement layer of 0.4 meters, respectively, for a conventional and a magnetized pavement layer.

FIG. 9 illustrates wireless power transfer efficiencies at different thicknesses of conventional and magnetic pavement layer above the transmitter coil.

DETAILED DESCRIPTION

Partially magnetized pavements and methods for wireless power transfer to electric vehicles are described herein. Advantageously, the partially magnetized pavements and methods for wireless power transfer to EVs efficiently charge EVs by creating a magnetic field that is ideal for wireless charging of EVs while simultaneously protecting the electrified portions of the road system (e.g., transmitter coil(s)) by providing a solid pavement layer between the EVs and the electrified portions of the road system.

Specifically, the disclosed embodiments provide a wireless power transfer that uses an inductively coupled power transfer method (ICPT) due to the relatively large air gap between EVs and the pavement. In ICPT, the transmitter coil creates an alternative magnetic field by alternative currents, which is transmitted to a receiver coil. The receiver coil generates its own alternative currents using the alternative magnetic field, which is used to charge the battery of the EV.

In traditional systems, while pavement does increase the distance between the transmitter coil and the receiver coil (which reduces wireless power transfer efficiency), the use of pavement over a transmitter coil is important for protection of the transmitter coil with respect to wear by traffic and certain effects of weather conditions. Simply adding magnetic materials to the pavement covering the transmitter coil can make the pavement act as a magnetic shield, further reducing the efficiency of the wireless power transfer. Specifically, the alternative magnetic field generated by the transmitter coil becomes trapped inside the pavement, preventing efficient wireless power transfer.

Advantageously, through the use of the disclosed partially magnetized pavement systems and methods, the magnetic flux of the generated magnetic field can be designed to match the frequency in the RLC circuits electrically coupled to the transmitter coil and the receiver coil, which maximizes the wireless power transfer efficiency. Indeed, the vertical pathways created by the partially magnetized pavement guide the magnetic flux of the magnetic field between the transmitter coil and the receiver coil, maximizing efficiency of the wireless power transfer. The vertical pathways created by the partially magnetized pavement can be varied based on coil size and configuration, as explained in detail below with respect to FIG. 5.

As used herein, pavement refers to a paved surface that may include asphalt, concrete, composite pavement, bituminous materials, gravel, and/or any other materials that may be used to build roadways and/or sidewalks (e.g., conventional pavement construction materials). Furthermore, the magnetized portion of the pavement described herein may be included as part of a layered pavement structure, with the pavement including other material layers (e.g., concrete layers).

Figure 1:
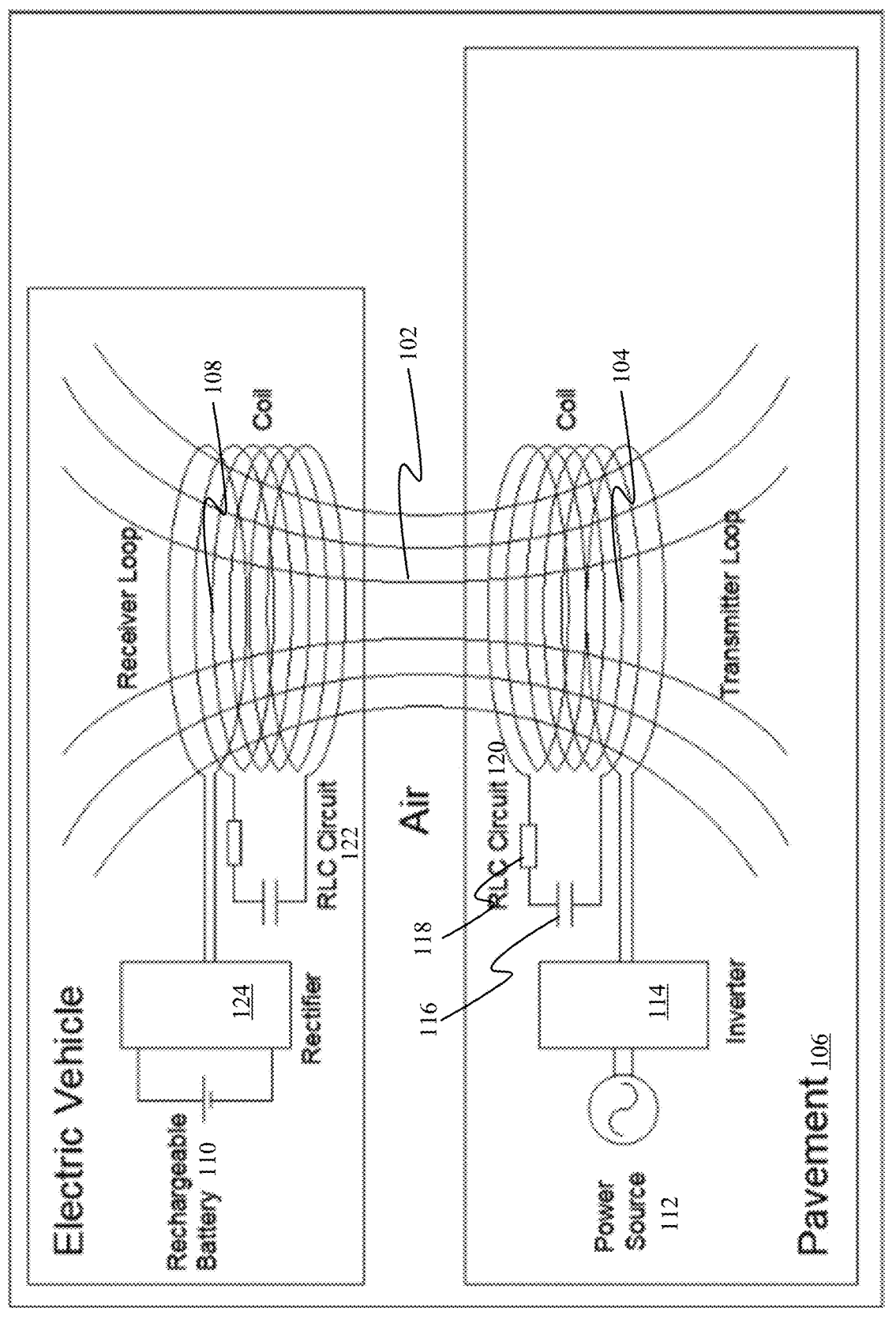
FIG. 1 illustrates an example of an inductively coupled power transfer system.

FIG. 1 illustrates an example of an inductively coupled power transfer system.

Referring to FIG. 1, an inductively coupled power transfer system 100 utilizes an alternative magnetic field 102 created by the transmitter coil 104 disposed in pavement 106 that is transmitted to a receiver coil 108 of an EV battery 110. The receiver coil 108 is induced to generate a current from the magnetic field 102 to charge the EV battery 110.

In detail, a power source 112 is electrically coupled to an inverter 114, which is electrically coupled to the transmitter coil 104, creating the magnetic field 102. The transmitter coil 104 is electrically coupled with a capacitor 116 and a resistor 118 to form a resistor-inductor-capacitor (RLC) circuit 120 at a system level that produces electrical resonance (e.g., with the transmitter coil 104 acting as the inductor in the RLC circuit 120). The resistor 118 may or may not be a discrete component in the RLC circuit 120. The receiver coil 108 generates an electric current from the magnetic field 102, which has its own RLC circuit 122. The generated electric current passes to a rectifier 124 electrically coupled to the receiver coil 108 before charging the EV battery 110.

In some cases, the inverter 114 is electrically coupled to at least two transmitter coils along a roadway and/or in a parking lot/electric vehicle charging center. In this way, one or more inverters electrically coupled to a power source 112 can supply electricity to an entire roadway and/or in a parking lot/electric vehicle charging center. In some cases, the inverter 114 is electrically coupled to a single transmitter coil (e.g., each transmitter coil includes its own corresponding inverter).

As described in more detail herein, the pavement 106 is configured with a magnetized portion disposed on certain areas of a region containing the transmitter coil 104.

Figure 2:
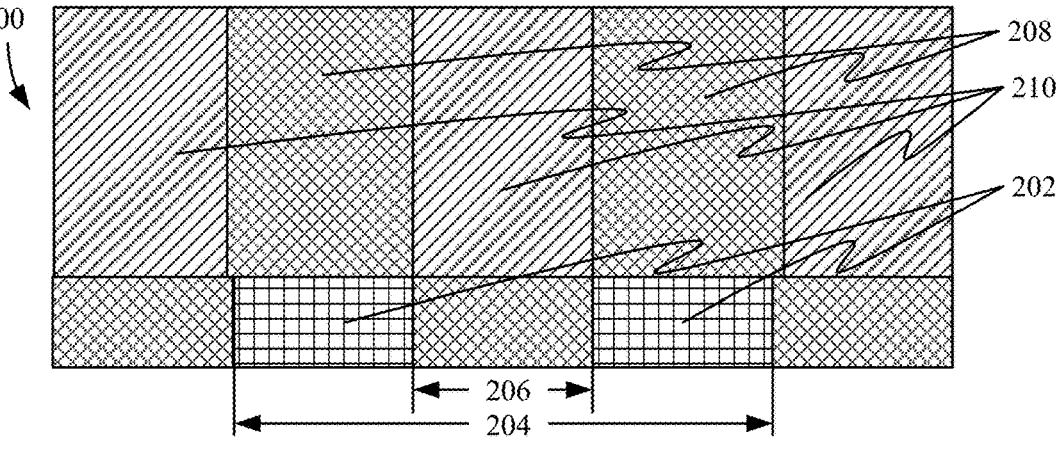
FIG. 2 illustrates a cut-away view of a coil disposed within a partially magnetized pavement.
Figure 3A:
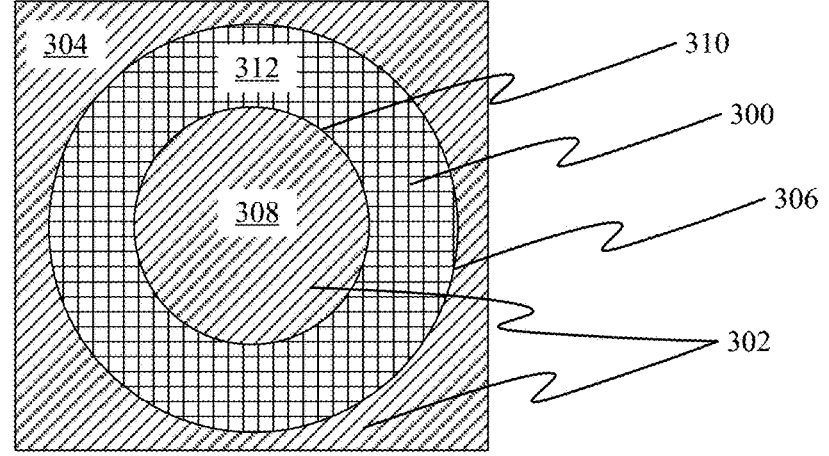
FIGS. 3A and 3B illustrate top-down views of transmitter coil shapes and resulting magnetized areas of a partially magnetized pavement.
Figure 3B:
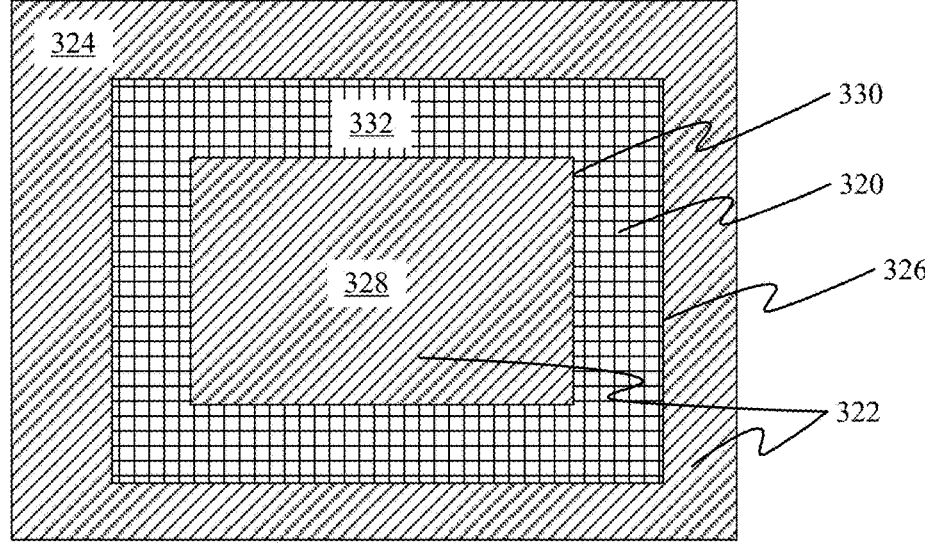

FIG. 2 illustrates a cut-away view of a coil disposed within partially magnetized pavement. Referring to FIG. 2, a partially magnetized pavement 200 includes a non-magnetized pavement portion 208 positioned vertically above the transmitter coil 202, and a magnetized pavement portion 210 positioned vertically above a first area (e.g., as illustrated in FIGS. 3A and 3B) outside the outer dimension 204 of the transmitter coil 202 and a second area (e.g., as illustrated in FIGS. 3A and 3B) surrounded by the inner dimension 206 of the transmitter coil 202 (e.g., within the first area surrounded by the inner dimension 206 of the transmitter coil 202). The magnetized pavement portion 210 within the second area (e.g., within the inner dimension 206) has a diameter less than or equal to the inner dimension 206 such that the magnetized pavement portion 210 does not overlap the transmitter coil 202. By avoiding overlap of the transmitter coil 202 with the magnetized pavement portion 210, wireless power transfer efficiency can be maintained at improved levels.

In some cases, the transmitter coil 202 may be embedded in a non-magnetized pavement unit (formed of pavement or insulating material) for ease of application during construction of the roadway. A mold may be provided for depositing the appropriate materials over the correct areas of the transmitter coil 202.

In some cases, the magnetized pavement portion 210 includes ferromagnetic material (e.g., iron, ferrite, cobalt, magnetite, dysprosium, nickel, awaruite, permalloy, and/or wairakite).

A plurality of transmitter coils 202 (e.g., and their associated components that form a charging unit) may be positioned along a direction of a roadway (e.g., with some spacing between each transmitter coil 202) so that an EV battery can be charged as the EV travels along the direction of the roadway.

FIGS. 3A and 3B illustrate top-down views of transmitter coil shapes and resulting magnetized areas of a partially magnetized pavement. Specifically, FIG. 3A illustrates a circular transmitter coil 300 and FIG. 3B illustrates a rectangular (or square) transmitter coil 320. Referring to FIG. 3A, magnetized pavement 302 is disposed at a first area 304 outside an outer dimension (e.g., outer diameter 306) of the circular transmitter coil 300 and at a second area 308 inside an inner dimension (e.g., inner diameter 310) of the circular transmitter coil 300. Although not shown in this Figure, an area 312 vertically above the circular transmitter coil 300 is covered by a non-magnetized pavement portion.

Referring to FIG. 3B, a magnetized pavement 322 is disposed at a first area 324 outside an outer dimension 326 of the transmitter coil 320 and at a second area 328 within an inner dimension 330 of the transmitter coil 320. Although not shown in this Figure, an area 332 vertically above the rectangular transmitter coil 320 is covered by a non-magnetized pavement portion.

Figures 4, 5:
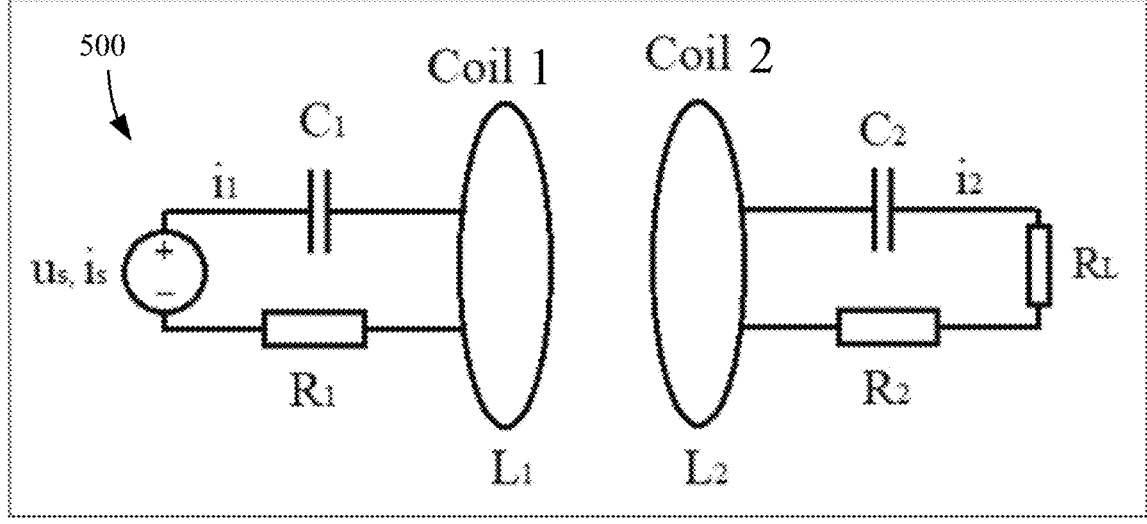
FIG. 4 illustrates a cut-away view of a partially magnetized pavement creating a magnetic field that reaches a receiver coil.
FIG. 5 illustrates a circuit model utilizing a transmitter coil and a receiver coil for wireless power transfer.

FIG. 4 illustrates a cut-away view of a partially magnetized pavement having an energized transmitter coil disposed therein that creates a magnetic field that reaches a receiver coil. Referring to FIG. 4, a partially magnetized pavement 400 includes a non-magnetized pavement portion 404 and magnetized pavement portions 406. A transmitter coil 402 is disposed within the partially magnetized pavement 400. The transmitter coil 402 includes an outer dimension 408 and an inner dimension 410. The non-magnetized pavement portion 404 is positioned vertically above the transmitter coil 402. In some cases, the non-magnetized pavement portion may also be positioned over a portion within the inner dimension 410 of the transmitter coil 402, so long as at least some portion within the inner dimension 410 of the transmitter coil 402 is covered by a magnetized pavement portion 406. However, no area directly above (e.g., in a vertical direction) the transmitter coil 402 is covered by the magnetized pavement portion 406. The magnetized pavement portion 406 is positioned vertically above (and beside/within) a first area 412 that is surrounded by the inner dimension 410 of the transmitter coil 402 and a second area 414 that is outside the outer dimension 408 of the of the transmitter coil 402.

Therefore, a magnetic field 416 generated from the transmitter coil 402 flows through the first area 412 of the magnetized pavement portion 406, up through the receiver coil 418, and back down to the second area 414 of the magnetized pavement portion 406. The receiver coil 418 is induced to generate an electric current from the magnetic field 416 (e.g., as described with respect to FIG. 1).

Figure 14B:
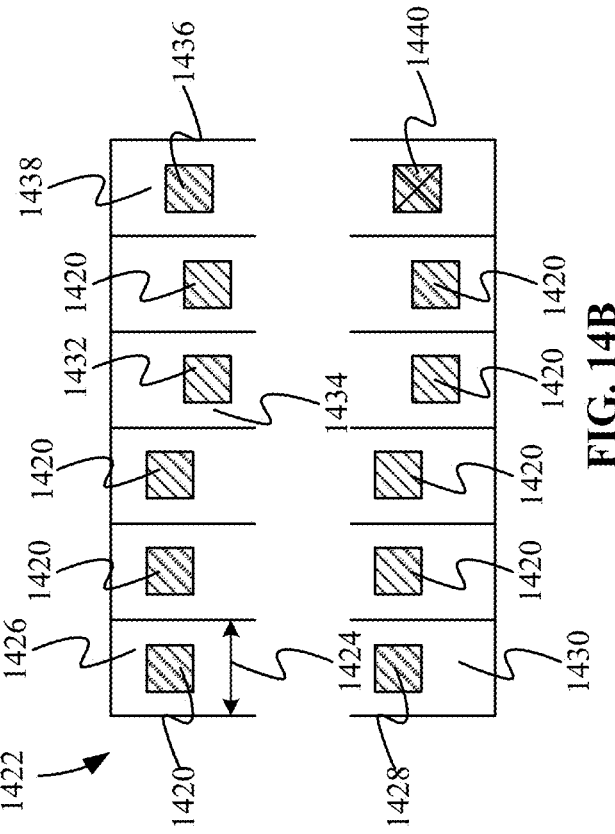
FIG. 14B illustrates a plurality of electric vehicle charging units positioned in a parking lot/electric vehicle charging center.
Figure 14A:
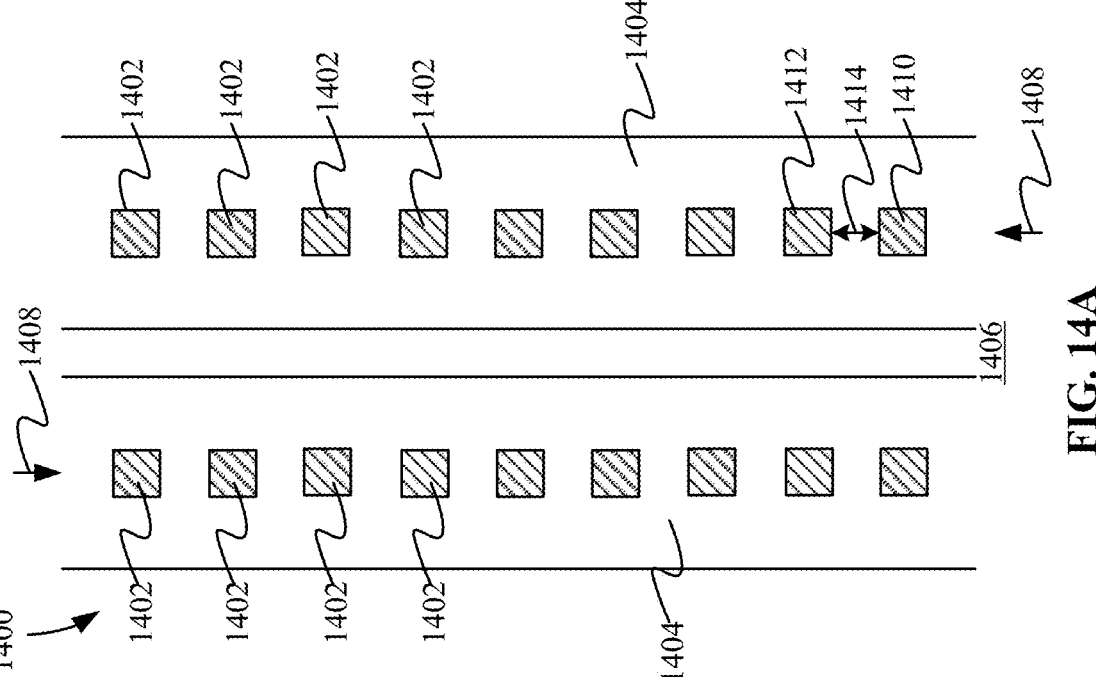
FIG. 14A illustrates a plurality of charging units positioned along a roadway.

FIG. 14A illustrates a plurality of charging units positioned along a roadway. Referring to FIG. 14A, an electric vehicle roadway charging system 1400 includes a plurality of electric vehicle charging units 1402 positioned in a center of a lane 1404 in a roadway 1406 and along a direction 1408 of the lane 1404 in the roadway 1406. This allows an electric vehicle to be charged while driving in the along the direction 1408 of the lane 1404 in the roadway 1406.

Each electric vehicle charging unit of the plurality of electric vehicle charging units 1402 is separated from a next electric vehicle charging unit of the plurality of electric vehicle charging units 1402 along the direction of the lane in the roadway by a predetermined distance. For example, a first electric vehicle charging unit 1410 of the plurality of electric vehicle charging units 1402 is separated from a second electric vehicle charging unit 1412 of the plurality of electric vehicle charging units 1402 along the direction of the lane in the roadway by a predetermined distance 1414. In some cases, the predetermined distance may be minimal (e.g., less than the radius/length of the transmitter coil in the electric vehicle charging unit). In some cases, the predetermined distance is determined by one or more factors, including but not limited to factors contained and/or described within equations [1]-[10] described below.

As described above with respect to FIGS. 1-4, each electric vehicle charging unit of the plurality of electric vehicle charging units 1402 includes a transmitter coil having an outer dimension and an inner dimension, a pavement layer, and a capacitor electrically coupled to the transmitter coil to form a resistor-inductor-capacitor circuit at a system level. The pavement layer includes a non-magnetized pavement portion positioned vertically above the transmitter coil and a magnetized pavement portion positioned vertically above a first area surrounded by the inner dimension of the transmitter coil and a second area outside the outer dimension of the transmitter coil.

In some cases, the electric vehicle roadway charging system 1400 further includes one or more inverters electrically coupled to the transmitter coil of at least two electric vehicle charging units of the plurality of electric vehicle charging units 1402. In this way, at least two electric vehicle charging units of the plurality of electric vehicle charging units 1402 can be electrically coupled to a single inverter. In some cases, the electric vehicle roadway charging system 1400 further includes a power source electrically coupled to the one or more inverters.

In some cases, each electric vehicle charging unit of the plurality of electric vehicle charging units 1402 further includes an inverter electrically coupled to the transmitter coil. In this way, each transmitter coil includes its own corresponding inverter. In some cases, the electric vehicle roadway charging system 1400 further includes a power source electrically coupled to the inverter of each electric vehicle charging unit of the plurality of electric vehicle charging units 1402.

FIG. 14B illustrates a plurality of electric vehicle charging units positioned in a parking lot/electric vehicle charging center. Referring to FIG. 14B, a plurality of charging units 1420 (e.g., each having similar or the same components described above with respect to FIGS. 1-4 and 14A) are included in a parking lot/electric vehicle charging center 1422. Each of the charging units of the plurality of charging units 1420 are positioned in a center 1424 of a parking space 1426 (e.g., as measured across the parking space 1426). In some cases, a charging unit 1428 is positioned towards the front of a parking space 1430 (e.g., as measured along a length of the parking space 1430). In some cases, a charging unit 1432 is positioned towards the back of a parking space 1434 (e.g., as measured along a length of the parking space 1434). In some cases, a charging unit 1436 is positioned towards the middle of a parking space 1438 (e.g., as measured along a length of the parking space 1438). In this way, an electric vehicle can park their vehicle for charging (e.g., over the transmitter coil of the charging unit) regardless of the placement of the receiver coil of the electric vehicle. In some cases, an electric vehicle pavement charging unit 1440 is marked for an electric vehicle or an operator of the electric vehicle to position a receiver coil of the electric vehicle over the transmitter coil of the charging unit 1440. In some cases, the electric vehicle pavement charging unit 1440 is marked with an "X" or other symbol, character, numbering and/or indicia that indicates where the transmitter coil of the charging unit 1440 is located.

Referring to both FIGS. 14A and 14B, conventional pavement/roadway can surround the charging units.

FIG. 5 illustrates a circuit model utilizing a transmitter coil and a receiver coil for wireless power transfer. Referring to FIG. 5, a circuit model 500 utilizing a transmitter coil $L_1$ and a receiver coil $L_2$ includes equivalent series of resistances $R_1$ and $R_2$, a load resistance $R_L$, a power supply with high frequency current $i_s$ (or voltage $u_s$), and capacitances $C_1$ and $C_2$ and inductances of the coils $L_1$ and $L_2$. With this design, electric current $i_1$ inside the transmitter coil $L_1$ and electric current $i_2$ inside the receiver coil $L_2$ are generated. Advantageously, it is possible to create electrical resonance with minimal energy loss.

With electrical current $i_1$ flowing though the transmitter coil $L_1$ and electrical current $i_2$ flowing through the receiver coil $L_2$, the coils $L_1$, $L_2$ can be treated as magnets in a magnetic field. Based on Kirchoff s voltage law, the equivalent circuit model can be expressed in equations [1] and [2] below:

$$\left(-j\frac{1}{\omega C_1} + j\omega L_1 + R_1\right)i_1 - j\omega M i_2 = u_s \tag{1}$$

$$\left(-j\frac{1}{\omega C_2} + j\omega L_2 + R_2 + R_L\right)i_2 - j\omega M i_1 = 0 \tag{2}$$

where $\omega$ is the angular velocity/frequency, j is the imaginary unit, and M is the mutual inductance between the coils $L_1$, $L_2$.

Once the transmitting the receiving coils $L_1$, $L_2$ are both under resonant states and their resistances are both equal to R, equations [1] and [2] can be rewritten into equations [3] and [4] below:

$$Ri_1 - j\omega M i_2 = u_s \tag{3}$$

$$(R+R_L)i_2 - j\omega M i_1 = 0 \tag{4}$$

The power transfer efficiency, $\eta$, of the partially magnetized pavement system can be written as equation [5] below:

$$\eta = \frac{P_{out}}{P_{in}} = \frac{R_L}{(R+R_L)\left(1 + \frac{R(R+R_L)}{(\omega M)^2}\right)} \tag{5}$$

As illustrated in equation [5], the power transfer efficiency of the wireless power transfer is primarily determined from the resistances $R_1$, $R_2$ (which are both equal to R in equation [5]) and mutual inductances M of the coils $L_1$, $L_2$. Meanwhile, if the coils $L_1$, $L_2$ are unchangeable (which may be the case in EV battery charging design), the maximum power transfer efficiency can be reached by adjusting the load resistance $R_L$ and/or the angular velocity/frequency $\omega$.

The total resistance of each coil $L_1$ and $L_2$ is equal to the summation of ohm resistance $R_o$, radiant resistance $R_r$, and the resistance due to skin effect $R_s$, which are illustrated in equations [6]-[8] below:

$$R_o = \sqrt{\frac{\mu_0 \omega}{2\sigma}} \frac{Nr}{2a} \tag{6}$$

$$R_r = \sqrt{\frac{\mu_0}{\varepsilon_0}}\left[\frac{\pi}{12}N^2\left(\frac{\omega r}{c}\right)^4 + \frac{2}{3\pi^3}\left(\frac{\omega h}{c}\right)^2\right] \tag{7}$$

$$R_s \approx \frac{L\rho}{2\pi r\delta} \tag{8}$$

where $\rho$ is the resistivity of the coil, $\mu$ is the permeability of the coil, to is the permeability of the free space, L is the length of the coil, $\varepsilon_0$ permittivity of the free space, and h is the height of a spiral coil.

As can be seen, the ohm resistance $R_0$ is primarily determined by the material and geometric features of the coil, including the electrical conductivity of the coil, the number of coil turns N, the mean coil radius r, and the cross-section of a wire a. Compared to ohm resistance $R_0$, the radiant resistance $R_r$ is additionally determined by light speed c, which makes the resistance value negligible at this level of estimation. An additional factor of the resistance due to skin effect $R_s$ is skin depth, which is equal to $$\sqrt{\frac{2\rho}{\omega\mu}}.$$

After the inductances of the coils $L_1$ and $L_2$ are known, a general equation to determine the mutual inductance between coils is expressed in equation [9] below:

$$M = k\sqrt{L_1 L_2} \tag{9}$$

For circular coils, the coefficient of coupling k is strongly correlated to the distance of coils D and their radius, $r_1$ and $r_2$ in equation [10] below:

$$k = \frac{1}{\left[1 + 2^{2/3}\left(D/\sqrt{r_1 r_2}\right)^2\right]^{3/2}} \tag{10}$$

By providing magnetized pavement material in the pathway of the generated magnetic field, it is possible to improve the wireless power transfer efficiency.

Validation of Finite Element Models
Comparison Between Results from Analytical Solutions and Finite Element Models A wireless power transfer system consisting of two coils with an air-only transmission medium was evaluated using both analytical functions and numerical solutions. The specific coil design was made with copper with an average radius of 0.5 meters (inner radius of 0.2 meters and outer radius of 0.8 meters), a cross-section radius of 1.5 millimeters, and 20 number of turns. On one side, a current source of 20 amps is connected with the transmitter coil. On another side, a load resistance of 20 ohms is connected with the receiver coil. To achieve electrical resonance on both transmitter and receiver coils, two 1.3-$\mu$F capacitors are individually added in transmitting and receiving electrical circuits under an alternating current frequency of 75 kHz.

Based on outputs from the finite element model (FEM) of the wireless power transfer system, the transfer efficiency can be calculated as the ratio between powers inside these two coils. In addition, the coil characteristics (resistance, R. and inductance, $L_1$ and $L_2$) is achieved via coil geometry analysis in the numerical model. After inputting these coil characteristics, accompanying with other given parameters (e.g., load resistance, $R_L$, overall radius, r, operational frequency, $\omega$, coil distance, D), the efficiency of this wireless power transfer system can be calculated from equations [5], [9], and [10] above.

The wireless power transfer efficiencies of the wireless power transfer system calculated from FEM and analytical functions in various coil distances (from 0.1 meters to 0.5 meters) are illustrated in FIG. 6. In general, the results from the numerical solution and the analytical function are consistent with one another. If the coil distance is as close as 0.1 meters, the wireless power transfer efficiencies from both calculation methods are consistently around 95%. Once the coil distance increases to 0.5 meters, the wireless power transfer efficiencies drop significantly, although slight differences occur between the FEM and analytical solutions. This difference may be caused by the magnetic flux simulated by FEMs (which is closer to the real case with less magnetic flux crossing both coils in a longer gap) versus the magnetic flux simulated by the analytical solution (which assumes an ideal scenario).

Comparison Between Results from Laboratory Tests by Previous Study and Finite Element Models To further ensure the accuracy of FEMs built in this study, laboratory testing results measured by one previous study (Li F, Sun X, Zhu X, Chen Y, Feng J, *Magnetization properties of pavement materials and energy loss impact on wireless power transfer*. China Journal of Highway and Transport, 2021; 34(3):71) are used for comparing the corresponding FEM results obtained from this study. In the laboratory testing of the previous study, asphalt concrete specimens (AC) were placed between primary coil and secondary coil in turn. The size of each coil was in a diameter of 1.65 mm with 40 turns, with ferrite slabs on the back. The coil distance was fixed at 60 mm. An output voltage of 15 V in a resonant frequency of 87 kHz was supplied to the primary coil and wirelessly transmitted to the secondary coil. As a result, a maximum of 83.7% power transmission efficiency was captured while one asphalt concrete specimen was placed between coils.

The corresponding FEM with coils and asphalt concrete specimens in the same size are built through revising the original FEM developed by this study. The schematics of FEMs remained the same, except for some detailed design parameters of coils and asphalt concrete specimens. In addition, since the laboratory tests conducted by the previous study added ferrites behind coils, the corresponding FEM built by this study also involves ferrites cooperating with coils. As a result, under an output voltage of 15 V in 87 kHz, a transmission efficiency of 84.7% is obtained from the FEM, which is within ±1% difference from the laboratory testing result observed by previous study. The close transmission efficiency estimated from FEM built by this study against the one directly measured from laboratory tests by the previous study further confirms the reliability of FEM results calculated in this study.

Finite Elements Models of Wireless Power Transfer in Conventional and Partially Magnetized Pavement The FEM of the wireless power transfer system embedded in the pavement is built using COMSOL software. The model consists of two coils (one in air and another under pavement layer), one asphalt layer, and an air space. The COMSOL modules involved in this FEM include a Magnetic Fields module and an Electrical Circuit module. The pavement section with one traffic lane is modeled in a width of 3.6 meters and a length of 2 meters. The transmitter coil is embedded at a depth of 0.1-0.4 meters under the pavement surface, while the receiver coil on EVs is placed above the pavement surface at a height of 0.4 meters. Another 0.2 meter-thick base layer is placed under transmitter coil as part of pavement structure. The material properties of different components used in FEM for wireless charging simulation are listed in Table 1 below.

TABLE 1

| Material Properties of components in wireless charging pavement | | | |
|---|---|---|---|
| | Relative Permeability | Relative Permittivity | Electrical Conductivity |
| Air | 1 | 1 | 0 |
| Conventional Pavement | 1 | 5.3 | 0 |
| Coil (copper) | 1 | 1 | $6 \times 10^7$ |

For all electric components involved in the simulation, only coils are physically added in geometrics, while other electronic components are assembled in the Electric Circuit module. For geometric features of coil, the radius of coil is assumed as 0.5 meters, which is consistent that used by previous studies. Other basic features of coils, such as the number of turn and the cross-section area, are defined in the Magnetic Fields module, respectively as 20 and $1 \times 10^{-6}$ meters$^2$.

To improve the wireless power transfer efficiency, a partially magnetized pavement layer, consisting of traditional pavement materials and a magnetized material (e.g., as illustrated in FIGS. 2-4, is utilized. The electric conductivity and the relative permeability of a magnetized pavement material with 20% magnetite additives (and 80% conventional pavement construction materials) are set as 0.1 S/meter and 150, respectively. It should be understood that varying compositions of ferromagnetic material and conventional pavement construction materials may be used depending on the application (e.g., type of electric vehicle) and with varying levels of efficiency for those different applications depending on the specific composition of ferromagnetic material and conventional pavement construction materials used in the (partially) magnetized pavement material.

Results and Discussions

At a first simulation step, the thickness of pavement layers above the transmitter coil are initially set as 0.1 m and the distances between transmitting and receiving coils are set as 0.5 m. As results, the magnetic flux distributions within these two wireless power transfer systems are illustrated in FIGS. 7A and 7B. Since the magnetic flux density expressed via magnetic lines and arrows plotted in FIGS. 7A and 7B is magnitude controlled, the higher density of magnetic lines and the longer length of arrows reflect the higher strength of magnetic field. The results from FIGS. 7A and 7B shows that the strongest magnetic field is created by the transmitter coil under the pavement layer. Once the magnetic flux passes a conventional pavement layer (as illustrated in FIG. 7A), the magnetic field strength is dispersed. However, as the magnetic flux passes through the magnetized pavement layer (as illustrated in FIG. 7B), the magnetic field remains strong.

To illustrate the effect that the partially magnetized pavement layer has on guiding the magnetic flux through the pavement layer, the thickness of partially magnetized pavement layer is further increased from 0.1 meters to 0.4 meters. As illustrated in FIG. 8A, the magnetic field is scattered and weakened in a traditional pavement layer as the thickness of the pavement layer increases. As illustrated in FIG. 8B, a strong magnetic field passes through the partially magnetized pavement layer even as the thickness of the pavement layer increases. Based on those different magnetic flux distributions, the feasibility of improving wireless power transfer efficiency by creating a pathway to guide the magnetic field passing over the pavement layer is visibly demonstrated. It should be noted that this concept can also be implemented under other similar circumstances when a medium (e.g., pavement layer) inevitably needs to be between coils and can be partially magnetized.

Since the advantage of this partially magnetized pavement layer mainly relies on the pathway, which can better connect the magnetic flux between upper and lower coils, the length of pathway can affect the improvement of wireless power transfer efficiency. Intuitively, if the distance between transmitting and receiving coils needs to be longer, adding the partially magnetized layer significantly mitigates the negative impact of the distance on wireless power transfer efficiency. To verify this point and quantify the consistency of wireless power transfer efficiency improvement under different surface layer thicknesses over the transmitter coil, the wireless power transfer system with partially magnetized and unmagnetized pavement layers are respectively built in a wide range of surface layer thicknesses (0.1-0.4 meters). The transmitter coil is placed exactly below the pavement surface layers at a depth varying from 0.1 m to 0.4 meters; while the receiver coil remains above the pavement surface at a height of 0.4 meters (assuming the location of receiver coil on the electric vehicle has not changed).

The wireless power transfer efficiencies from a partially magnetized pavement layer and a conventional pavement layer are calculated for different thicknesses of pavement layer above the transmitter coil, as illustrated in FIG. 9. As expected, for either partially magnetized or unmagnetized pavement layer, the wireless power transfer efficiency gradually decreases as the transmitter coil thickness of the pavement layer increases. However, the advantage from a partially magnetized pavement layer on improving wireless power transfer efficiency is more significant when the surface layer above the transmitting coil gets thicker. As the depth of transmitter coil increases from 0.1 m to 0.4 meters, the improvement of wireless power transfer efficiency increases from 1.5% (71.5% vs. 70.1%) to 12.3% (39.9% vs. 27.6%) due to the partially magnetized layer. Moreover, the deduction of wireless power transfer efficiency by increasing each 0.1 meter transmission coil depth is approximately −10% for partially magnetized layer versus −15% for a conventional pavement layer, which also reflects the mitigation function against wireless power transfer efficiency deduction from the partially magnetized layer over the conventional pavement layer. These findings indicate that the advantage brought by the partially magnetized layer is more significant when the wireless charging module needs to be embedded deeper in the pavement structure to prevent load-induced damage and increase the system longevity.

Figure 10:
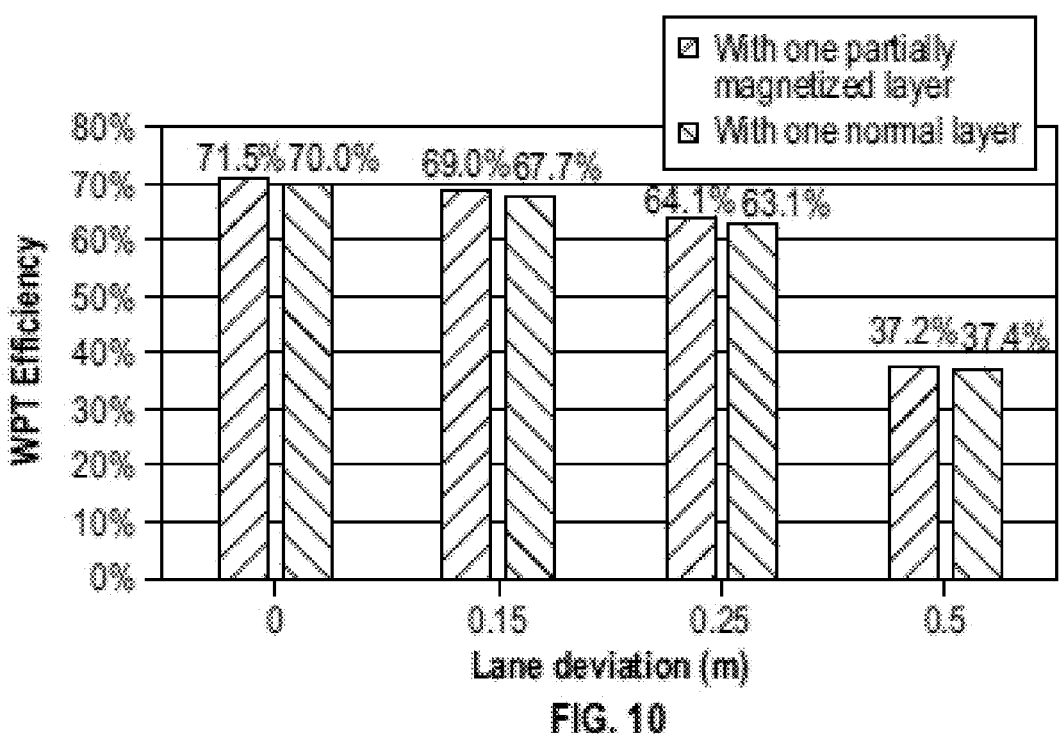
FIG. 10 illustrates wireless power transfer efficiencies at different lane deviations by vehicle wandering in a 0.1-meter thick conventional and magnetized pavement layer.
Figure 11:
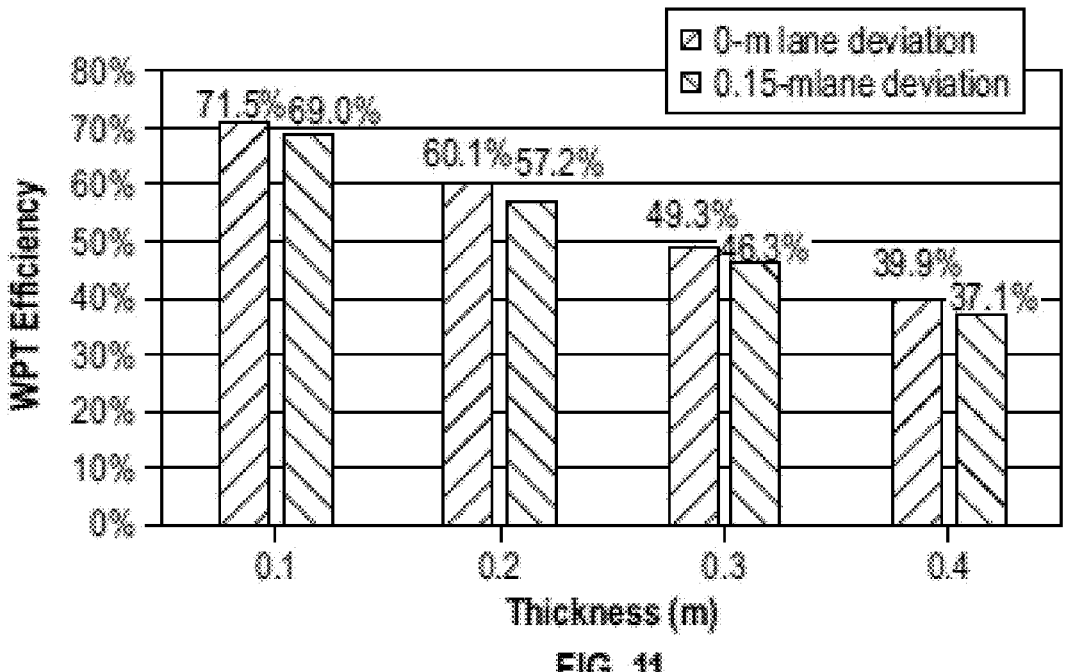
FIG. 11 illustrates the wireless power transfer efficiencies changed by the thickness of partially magnetized pavement layers above the transmitter coil under zero and 0.15-meter lane deviation scenarios.
Figure 12:
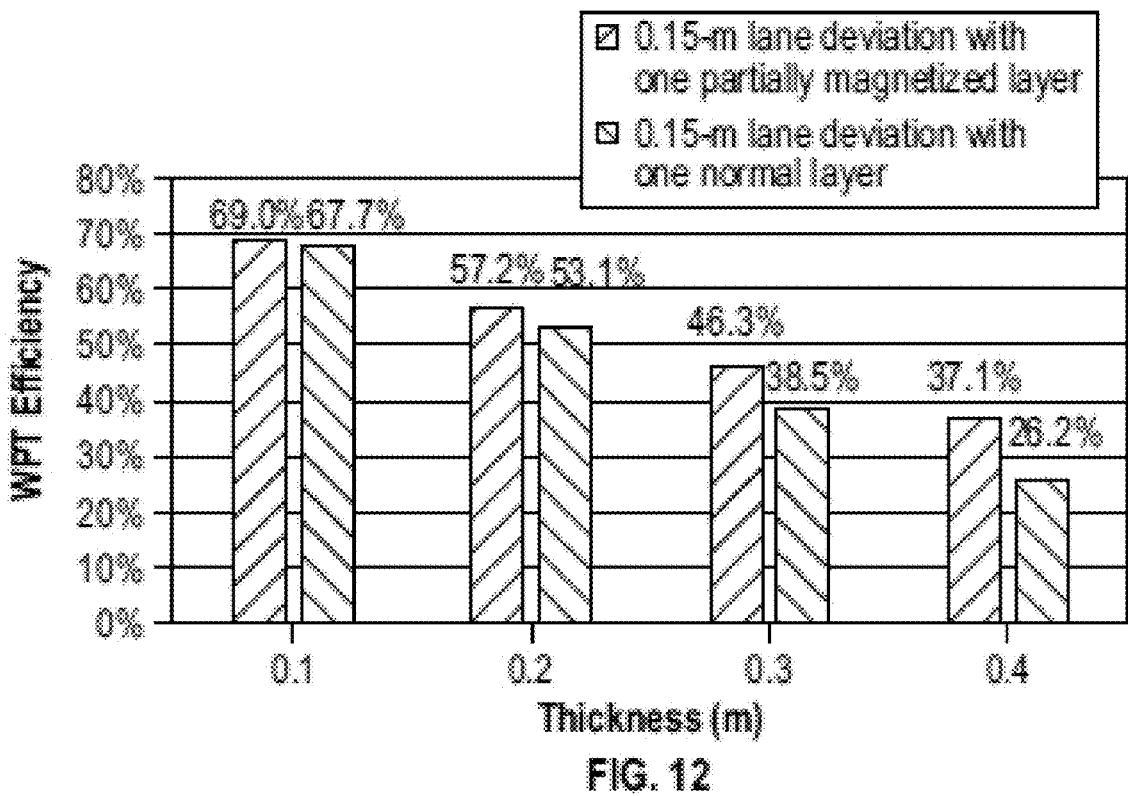
FIG. 12 illustrates the wireless power transfer efficiency comparison between conventional and partially magnetized pavement layers having varying pavement layer thickness under a 0.15-meter lane deviation scenario.

Another issue affecting wireless power transfer efficiency is vehicle wandering. Vehicle wandering is a common phenomenon for human driving vehicles due to the uncertainty of lateral position of wheels in traffic lanes. Considering that lateral offsets between transmitter and receiver coils will occur due to wandering of electric vehicles, the advantage from partially magnetized layer on wireless power transfer efficiency under vehicle wandering scenarios is illustrated in FIG. 10. Specifically, FIG. 10 illustrates the calculated efficiencies of wireless power transfer systems with different lane deviation by vehicle wandering between transmitting and receiving coils (0, 0.15, 0.25, and 0.5 meters). For comparison purposes, the same coil configurations are simulated with a conventional pavement layer as the baseline. As can be seen, for both layer designs, the wireless power transfer efficiencies are decreased as the lane deviations are enlarged, but not in a linear fashion: a 27% of dramatic wireless power transfer efficiency drop occurs when the lane deviation is increased from 0.25 m to 0.5 m. Meanwhile, the advantage of partially magnetized pavement layer on wireless power transfer efficiency improvement remains if the coil offset reaches to 0.25 meters. However, once the coil offset is further increased to 0.5 meters, the wireless power transfer efficiency improvement from the partially magnetized pavement layer is essentially eliminated. This can be caused by a short-circuit magnetic flux: once the receiver coil is deviated from centerline, the pathway of magnetic flux through pavement layer can be cut by a fully magnetized area above the transmitter coil. Given the average lane deviation by vehicle wandering is about 0.15 meters (0.5 ft), the advantage from the partially magnetized pavement layer on wireless power transfer efficiency is still effective. Under a 0.15-m average driver lane deviation scenario, FIG. 11 illustrates the wireless power transfer efficiencies changed by the thickness of partially magnetized pavement layers above the transmitter coil under zero and 0.15 meter lane deviation scenarios. The results reflect that the wireless power transfer efficiency differences under zero and 0.15 meter lane deviation scenarios is approximately a 2%-3% level of difference, regardless of the varied thickness of the partially magnetized layer. This finding shows no interaction between lane deviations and layer thicknesses on the wireless power transfer efficiency improvement. In other words, for a wireless power transfer system at any specific layer thickness, the wireless power transfer efficiency under 0.15-m lane deviation can be predicted by deducting 2 to 3% from the wireless power transfer efficiency measured under no lane deviation. Accounting for the lane deviation affect, FIG. 12 illustrates the wireless power transfer efficiency comparison between conventional and partially magnetized pavement layers having varying pavement layer thickness under a 0.15-lane deviation scenario. Similar to the results illustrated in FIG. 9 (without lane deviation involved), a partially magnetized layer can improve the wireless power transfer efficiency more significantly (e.g., from 1% to 10%) as the thickness of the pavement layer increases from 0.1 meters to 0.4 meters. More importantly, with a 0.15-m lane deviation, the drop of wireless power transfer efficiency by each 0.1 meter thickness increment is minimized in a partially magnetized layer while that drop continuously increases in a conventional pavement layer. This divergent wireless power transfer efficiency drop results can be contributed to the changes in magnetic field lines due to the partially magnetized pavement layer versus the conventional pavement layer. This finding demonstrates that the wireless power transfer efficiency improvement created by the partially magnetized pavement layer will not only remain, but increase when lane deviation occurs.

Figure 13:
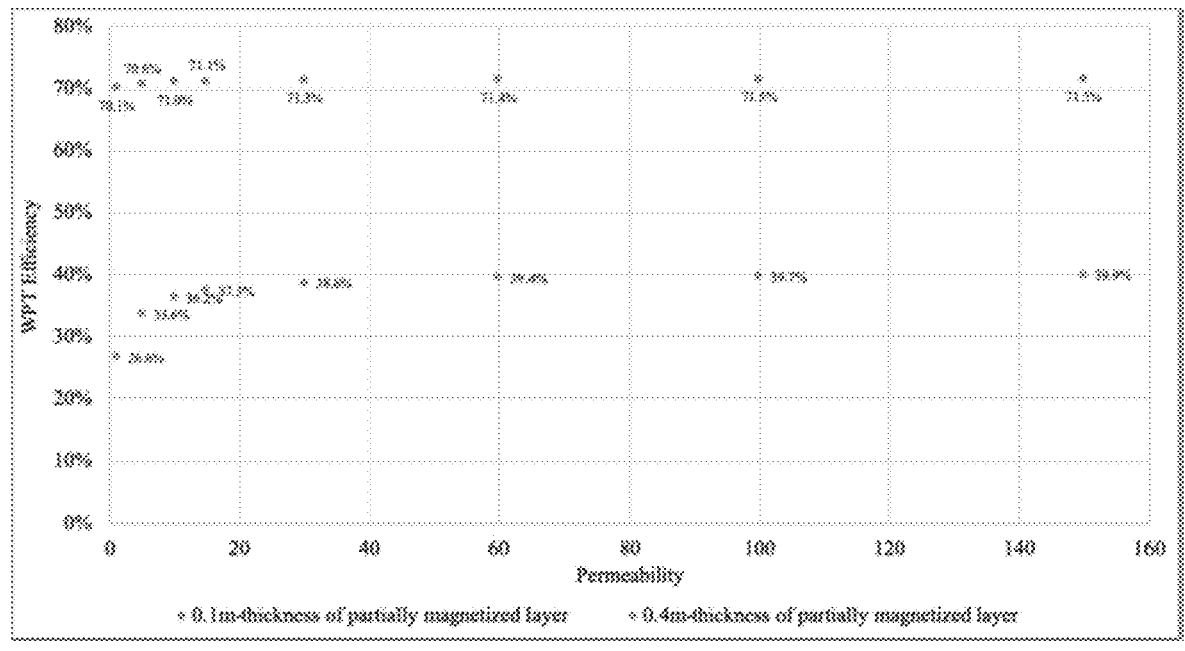
FIG. 13 illustrates wireless power transfer efficiencies for a partially magnetized pavement layer having different permeability values for the magnetized portion.

In theory, increasing the permeability of magnetized area can better control magnetic flux and further improve wireless charging efficiency. However, due to the limit length of the magnetic flux pathway (e.g., the thickness of the pavement layer), such efficiency improvement from material property changes can be limited. To further study the effect of permeability of the magnetic flux pathway on the wireless power transfer efficiency, the wireless power transfer system was simulated at two different thicknesses of partially magnetized pavement layer above the transmitter coil (0.1 meters and 0.4 meters) with several permeability levels in the magnetized area (from 1, 5, 10, 15, 30, 60, 100, to 150). The relevant wireless power transfer efficiency changes were then observed as the permeability was increased, as shown in FIG. 13. As illustrated in FIG. 13, in general, the wireless power transfer efficiency increases as the permeability of magnetized pavement layer increases. However, with 0.1 meter thickness of partially magnetized layer, the improvement of 1% is limited (from 70.1% to 71.1%) and can be easily reached with a permeability of 15 from a magnetized pathway. Previous work has found that adding 20% magnetic additives into cement can increase permeability to 150, thus a much smaller content of magnetic powder is needed to sufficiently increase wireless power transfer efficiency by 1%. On the other hand, once the thickness of partially magnetized layer is increased to 0.4 meters, the improvement is significantly amplified to 13.3% (from 26.6% to 39.9%) after the permeability of magnetized pathway increases from 1 to 150. This result shows the effect of permeability on wireless power transfer efficiency depends on the thickness of partially magnetized pavement layer.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A partially magnetized pavement for improved efficiency of electric vehicles charging through wireless power transfer, comprising:
    a non-magnetized pavement portion positioned vertically above a transmitter coil; and
    a magnetized pavement portion positioned vertically above a first area surrounded by an inner dimension of the transmitter coil and a second area outside an outer dimension of the transmitter coil.

2. The partially magnetized pavement of claim 1, wherein the magnetized pavement portion comprises ferromagnetic material.

3. The partially magnetized pavement of claim 2, wherein the ferromagnetic material is ferrite powder.

4. The partially magnetized pavement of claim 2, wherein the magnetized pavement portion comprises ferromagnetic material and conventional pavement construction materials.

5. The partially magnetized pavement of claim 1, wherein the non-magnetized pavement portion is made from conventional pavement construction materials.

6. The partially magnetized pavement of claim 1, wherein the first area of the magnetized pavement portion is less than or equal to an area within the inner dimension of the transmitter coil.

7. An electric vehicle pavement charging system, comprising:
    a transmitter coil having an outer dimension and an inner dimension;
    a pavement layer comprising:
        a non-magnetized pavement portion positioned vertically above the transmitter coil; and
        a magnetized pavement portion positioned vertically above a first area surrounded by the inner dimension of the transmitter coil and a second area outside the outer dimension of the transmitter coil; and
    a capacitor electrically coupled to the transmitter coil to form a resistor-inductor-capacitor circuit at a system level.

8. The electric vehicle pavement charging system of claim 7, wherein the resistor-inductor-capacitor circuit produces electrical resonance at the system level.

9. The electric vehicle pavement charging system of claim 8, further comprising a resistor electrically coupled to the transmitter coil to further form the resistor-inductor-capacitor circuit.

10. The electric vehicle pavement charging system of claim 7, wherein the electric vehicle pavement charging system is positioned in a center of a parking space.

11. The electric vehicle pavement charging system of claim 10, wherein the electric vehicle pavement charging system is marked for an electric vehicle or an operator of the electric vehicle to position a receiver coil of the electric vehicle over the transmitter coil of the electric vehicle pavement charging system.

12. The electric vehicle pavement charging system of claim 7, further comprising an inverter electrically coupled to the transmitter coil.

13. The electric vehicle pavement charging system of claim 12, further comprising a power source electrically coupled to the inverter.

14. An electric vehicle roadway charging system, comprising:
    a plurality of electric vehicle charging units positioned in a center of a lane in a roadway and along a direction of the lane in the roadway, wherein each electric vehicle charging unit of the plurality of electric vehicle charging units is separated from a next electric vehicle charging unit of the plurality of electric vehicle charging units along the direction of the lane in the roadway by a predetermined distance, each electric vehicle charging unit of the plurality of electric vehicle charging units comprising:
        a transmitter coil having an outer dimension and an inner dimension;
        a pavement layer comprising:
            a non-magnetized pavement portion positioned vertically above the transmitter coil; and
            a magnetized pavement portion positioned vertically above a first area surrounded by the inner dimension of the transmitter coil and a second area outside the outer dimension of the transmitter coil; and a capacitor electrically coupled to the transmitter coil to form a resistor-inductor-capacitor circuit at a system level.

15. The electric vehicle roadway charging system of claim 14, further comprising one or more inverters, each of the one or more inverters electrically coupled to the transmitter coil of at least two electric vehicle charging units of the plurality of electric vehicle charging units.

16. The electric vehicle roadway charging system of claim 15, further comprising a power source electrically coupled to the one or more inverters.

17. The electric vehicle roadway charging system of claim 14, wherein each electric vehicle charging unit of the plurality of electric vehicle charging units further comprises an inverter electrically coupled to the transmitter coil.

18. The electric vehicle roadway charging system of claim 17, wherein each electric vehicle charging unit of the plurality of electric vehicle charging units further comprises a power source electrically coupled to the inverter.

19. The electric vehicle roadway charging system of claim 14, wherein the resistor-inductor-capacitor circuit produces electrical resonance at the system level.

20. The electric vehicle roadway charging system of claim 19, wherein each electric vehicle charging unit of the plurality of electric vehicle charging units further comprises a resistor electrically coupled to the transmitter coil to further form the resistor-inductor-capacitor circuit.

* * * * *